US009245128B2

(12) United States Patent
Karaa et al.

(10) Patent No.: US 9,245,128 B2
(45) Date of Patent: Jan. 26, 2016

(54) LIMITING ENTERPRISE APPLICATIONS AND SETTINGS ON DEVICES

(71) Applicant: Microsoft Corporation, Redmond, WA (US)

(72) Inventors: Hassen Karaa, Bellevue, WA (US); Michael Healy, Duvall, WA (US); Brett D. A. Flegg, Redmond, WA (US); Gaurav Dhawan, Seattle, WA (US); Jeffrey Sutherland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/787,420

(22) Filed: Mar. 6, 2013

(65) Prior Publication Data

US 2014/0259178 A1    Sep. 11, 2014

(51) Int. Cl.
*G06F 21/60* (2013.01)
*G06F 21/51* (2013.01)
*G06F 9/445* (2006.01)

(52) U.S. Cl.
CPC  *G06F 21/60* (2013.01); *G06F 8/61* (2013.01); *G06F 21/51* (2013.01); *G06F 2221/2149* (2013.01)

(58) Field of Classification Search
CPC ..... H04W 4/001; H04W 4/003; H04W 12/00; G06F 21/60; G06F 21/51; G06F 8/61; G06F 2221/2149
See application file for complete search history.

(56) References Cited

U.S. PATENT DOCUMENTS

| 7,289,788 | B2 | 10/2007 | Shan |
| 7,409,208 | B1 * | 8/2008 | Clare et al. ................... 455/419 |
| 7,865,938 | B2 | 1/2011 | Shahbazi |
| 7,970,386 | B2 * | 6/2011 | Bhat et al. ................... 455/414.1 |
| 8,229,858 | B1 * | 7/2012 | Mazza et al. ................... 705/59 |
| 8,239,918 | B1 | 8/2012 | Cohen |
| 8,285,578 | B2 | 10/2012 | Sheppard |
| 8,595,489 | B1 | 11/2013 | Faaborg et al. |
| 2004/0103214 | A1 | 5/2004 | Adwankar et al. |

(Continued)

FOREIGN PATENT DOCUMENTS

WO    WO 2004003708 A2    1/2004

OTHER PUBLICATIONS

Meurer, Simon, and Roland Wismüller. "APEFS: An Infrastructure for Permission-Based Filtering of Android Apps." Security and Privacy in Mobile Information and Communication Systems. Springer Berlin Heidelberg, 2012. 1-11.*

(Continued)

*Primary Examiner* — Tae Kim
*Assistant Examiner* — Louis Teng
(74) *Attorney, Agent, or Firm* — Aneesh Mehta; Raghu Chinagudabha; Micky Minhas (57) ABSTRACT

Installing apps and setting configuration on a device. A method includes receiving user input. The user input indicates a level of control that a user is willing to give an enterprise over the device. The method further includes determining, based on the level of control indicated by the user input, a set of apps allowed to install on the device. The set of apps allowed to install on the device is limited by the level of control indicated by the user. The method further includes authorizing installation of the set of apps on the device while restricting installation of other apps that would be authorized had the user selected a different level of control that the user is willing to give the enterprise over the device.

21 Claims, 6 Drawing Sheets

(56) References Cited

U.S. PATENT DOCUMENTS

| | | | | |
|---|---|---|---|---|
| 2004/0111643 | A1* | 6/2004 | Farmer | 713/201 |
| 2008/0141242 | A1 | 6/2008 | Shapiro | |
| 2010/0088367 | A1* | 4/2010 | Brown et al. | 709/203 |
| 2010/0299152 | A1 | 11/2010 | Batchu et al. | |
| 2010/0313196 | A1 | 12/2010 | De Atley et al. | |
| 2011/0015983 | A1 | 1/2011 | Bonnat | |
| 2011/0167105 | A1 | 7/2011 | Ramakrishnan et al. | |
| 2011/0202914 | A1 | 8/2011 | Kim et al. | |
| 2011/0252240 | A1 | 10/2011 | Freedman et al. | |
| 2012/0032945 | A1* | 2/2012 | Dare et al. | 345/418 |
| 2012/0084184 | A1 | 4/2012 | Raleigh et al. | |
| 2012/0129503 | A1* | 5/2012 | Lindeman et al. | 455/414.1 |
| 2013/0091542 | A1* | 4/2013 | Cohen | 726/1 |
| 2014/0157256 | A1* | 6/2014 | Marshall et al. | 717/178 |

OTHER PUBLICATIONS

"Symantec Mobile Management for Configuration Manager", Retrieved on: Nov. 20, 2012, Available at: https://www.symantec.com/mobile-management-configuration-manager.

"Zenprise MobileManager", Retrieved on: Nov. 20, 2012, Available at: http://www.zenprise.com/products/zenprise-mobilemanager.

"Cloud-based Enterprise MDM", Retrieved on: Nov. 20, 2012, Available at: http://www.mformation.com/enterprise-solutions/cloud-based-enterprise-mdm.

"An IT Manager's Guide to Managing Personal Devices in the Enterprise", Retrieved on: Nov. 20, 2012, Available at: http://www.sybase.in/files/White_Papers/IT-Mangers-Guide-WP.pdf.

"Understanding Mobile Device Management", Retrieved on: Nov. 20, 2012, Available at: http://technet.microsoft.com/en-us/library/ff959225.aspx.

"How to Add and Remove Apps," Published on: Feb. 29, 2012, Available at: http://technet.microsoft.com/en-us/library/hh852635.aspx#SideloadingRequirements.

"Add Computers, Users, and Moblie Devices to Windows Intune," Retrieved on: Dec. 26, 2012, Available at: http://technet.microsoft.com/en-us/library/hhhh441723.

"The Enterprise Sideloading Story on Windows 8? it's Complicated", Retrieved on: Dec. 26, 2012, Available at: http://www.zdnet.com/the-enterprise-sideloading-story-on-windows-8-its-complicated-7000006742/.

"When Mobile Device Management Isn't Enough," Retrieved on: Dec. 27, 2012, Available at: http://interaction.nl.scc.com/www/downlad/Data%20Loss%20Prevention%20Whitepaper.pdf.

"Deploying iPhone and iPad Mobile Device Management," Retrieved on: Dec. 27, 2012, Available at: http://images.apple.com/ipad/business/docs/iOS_MDM_Mar12.pdf.

"SysAid MDM User Guide for Android," Retrieved on: Dec. 28, 2012, Available at: http://www/sysaid.com/betahelp/MDM_Android_Guide_files/MDM_Android_Guide.pdf.

"Mobile Device Management (MDM)", Retrieved on: Dec. 27, 2012, http://utahta.wikispaces.net/file/view/Product+Description+Mobile+Device+Management+Services.pdf.

"Mobile Device Management in iOS," Retrieved on: Aug. 15, 2012, Available at: http://www.apple.com/iphone/business/it-center/deployment-mdm.html.

BUSH: "Managing "BYO" PCs in the Enterprise," Published Aug. 16, 2012, Available at: http://blogs.msdn.com/b/ukfe/archive/2012/08/16/managing-quot-byo . . . .

International Search Report & Written Opinion for PCT Patent Application No. PCT/US2014/019793, Mailed Date: Jun. 4, 2014, Filed Date: Mar. 3, 2014, 9 pages/.

Office Action dated Sep. 25, 2014 cited in U.S. Appl. No. 13/787,390.

U.S. Appl. No. 13/787,390, filed Mar. 6, 2013, Karaa et al.

U.S. Appl. No. 13/787,390, Jun. 16, 2014, Office Action.

Redfield, Will, "Symantec Mobile Management Suite: Enabling Mobile Productivity Without Sacrificing Protection", Retrieved on: Nov. 21, 2012, Available at: http://www.symantec.com/connect/blogs/symantec-mobile-management-suite-enabling-mobile-productivity-without-sacrificing-protection.

"Unenrolling iOS Devices", Retrieved on: Dec. 28, 2012, Available at: http://robotcloud.screenstepslive.com/s/2459/m/8435/I/79402-unenrolling-ios-devices.

Office Action dated Jan. 7, 2015 cited in U.S. Appl. No. 13/787,390.
Office Action dated May 1, 2015 cited in U.S. Appl. No. 13/787,390.
Office Action dated Sep. 23, 2015 cited in U.S. Appl. No. 13/787,390.

* cited by examiner

LIMITING ENTERPRISE APPLICATIONS AND SETTINGS ON DEVICES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Current networks have allowed many new and different types of devices to be networked. One of the major trends in IT in recent years has been the drive towards "consumerization of IT," which is a term describing how consumer technology, from phones to PCs, is bleeding into business organizations in all forms and fashions. And increasingly, the devices that are showing up are owned by, and liable to the employee rather than the organization for which they work. This is seen most notably in the smartphone device category, but more recently also in tablets or other portable device form factors that are increasingly showing up in the workplace. As organizations embrace consumerization, IT must consider how much control they can exert over a user's device, whether personally owned or owned by the enterprise, and how much management of the device is "good enough."

The device may be stolen or the device may host a mobile app that turns out to be Trojan horses that collect saved passwords or log keystrokes and other data. Thus, there may be a desire to control what data and apps can be stored on the device. However, as the device may be used for personal purposes, and not just enterprise purposes, there may also be some desire on the user's part to have personal data and apps not be under enterprise control. Previous solutions are either too heavy handed with management and take complete control over users' devices or are too light on management and security, allowing near unfettered access by a user of enterprise resources using their devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of installing apps and setting configuration on a device. The method includes receiving user input. The user input indicates a level of control that a user is willing to give an enterprise over a device. The method further includes determining, based on the level of control indicated by the user, a set of apps allowed to install on the device. The set of apps allowed to install on the device is limited by the level of control indicated by the user. The method further includes authorizing installation of the set of apps on the device while restricting installation of other apps that would be authorized had the user selected a different level of control that the user is willing to give the enterprise over the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein include functionality for managing devices, which in some embodiments may be personally owned devices that are used in an enterprise environment. In particular, a device may be generally controlled by a user and not the enterprise, but may still be able to be used in the enterprise environment with appropriate control on the device. In particular, the enterprise may exert control over certain aspects of the device, while allowing the user to control other aspects of the device without enterprise interference or intrusion. This management approach balances meeting the security needs of the enterprise while maintaining the user's control over the device and minimizing any impact of the device performance. Embodiments address how to deliver configuration and software that users need in the enterprise context, like apps and data-access on any device, with enough IT control to assert that the device is trustworthy, while avoiding compromising the user's privacy on their device.

Various embodiments may exhibit various aspects. For example, embodiments may implement an enrollment experience where a user can go through a built in OS component to connect to the enterprise work environment. Alternatively or additionally, embodiments may exhibit a collection of limited amount of inventory that is enough to assess the device's security but not enough to take control of the device and intrude on the user's privacy. Alternatively or additionally, embodiments may exhibit performance aware on demand app distribution where a notification service is used to initiate the installation of apps. Alternatively or additionally, embodiments may exhibit disconnecting from an enterprise that blocks all the apps and/or resets settings obtained from the enterprise.

Enterprise Device Management

With more and more people providing their own hardware for work, "bring your own device" (BYOD) is becoming more commonplace and IT Pros want to have the confidence that they can support their clients who follow this trend. The presence of BYOD does not change the need for IT Pros to manage, secure, and remain accountable for the network assets of an organization. Written policies are often ineffective at enforcing enterprise policies.

Embodiments illustrated herein may include functionality for managing personally owned device in an enterprise by delivering the settings and software that users need, like apps and data-access on any device, with enough IT control to assert that the device is trustworthy, while avoiding any compromise of the user's privacy on their personal device. It is understood that concepts described herein also are applicable to other types of devices that are used in an enterprise setting, such as enterprise-owned devices on which users expect privacy with respect to select applications, data, settings, etc.

Figure 1:
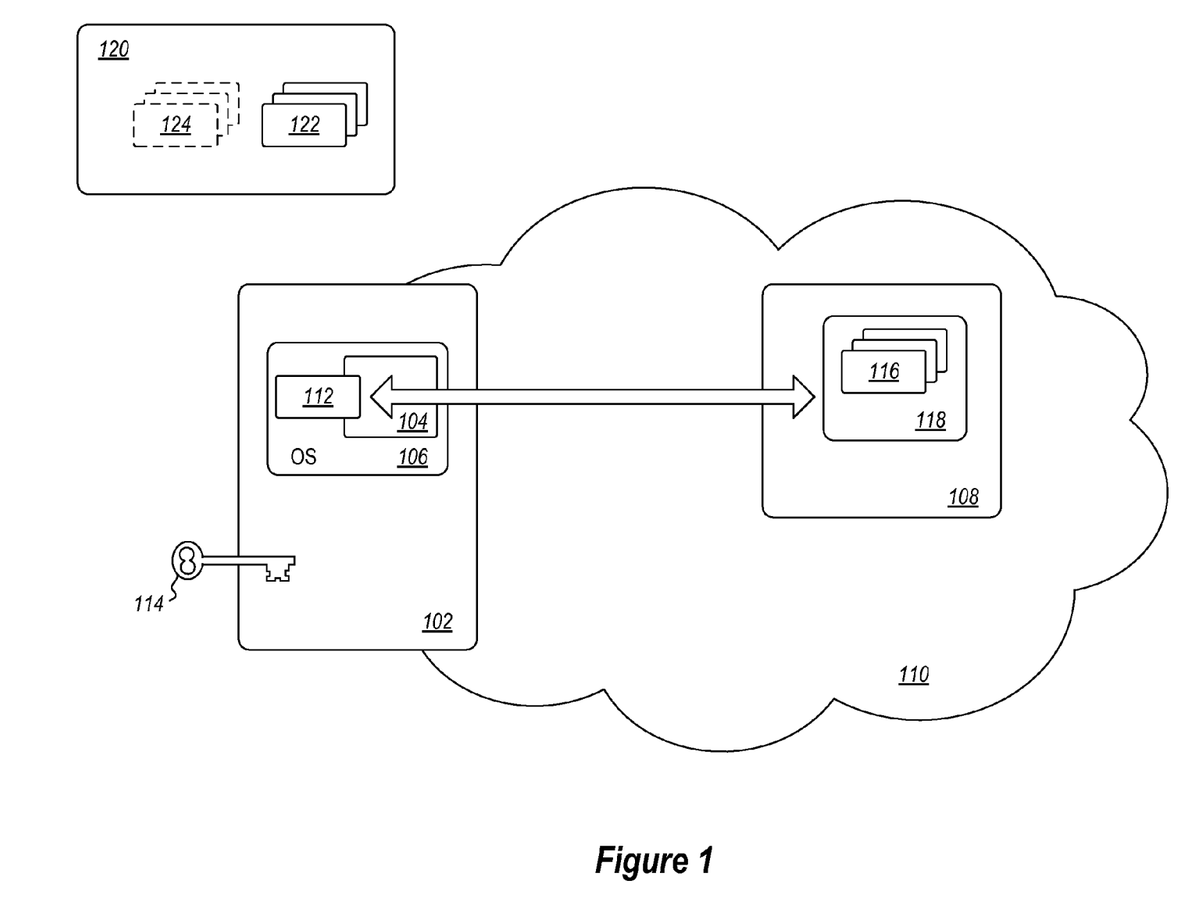
FIG. 1 illustrates an environment including an enterprise network and a device connected to the enterprise network.

Referring now to FIG. 1, a device 102 is illustrated. The device 102 may be a computing device such as a cell phone, pda, tablet, laptop, or other device that a user may choose to connect to an enterprise environment network 110. Some embodiments integrate a light management component (agent 104) built into the device's operating system 106 that can communicate with a management infrastructure 108 in the enterprise network 110 to deliver line of business (LOB) applications (sometimes referred to colloquially and herein as apps) to users.

The management solution has two client installed portions: the system management component, which may be referred to herein as an agent 104; and a user interface, which may be referred to as the self-service portal, or SSP 112, that the device user uses to browse for and install LOB apps made available to them. The SSP 112 may be implemented in a number of different ways, such as an app on the device 102, a web page/service that runs in the user's browser on the device 102, or other interface. Notably, a request to install an app for the user of the device 102 does not need to originate from the device 102 itself. In some embodiments, it may be done from another machine. In the illustrated example, however, both portions of the management solution installed at the client may be designed to be well behaved citizens of the operating system 106 in terms of user experience, power management/battery life, network awareness (for metered networks), and overall functionality.

The agent 104 does most of the heavy lifting on the client device 102. It configures the client device 102 to communicate with the organization's management infrastructure 108; periodically, or by some trigger of the management infrastructure 108, synchronizes with the management infrastructure 108 to check for any updated LOB apps and apply the latest settings policies configured by IT for the device 102; and handles the actual download and installation of any LOB apps that the user wants to install. Finally, if the user or the administrator chooses to remove the device 102 from the management infrastructure 108, it clears the configuration of the agent 104 itself and disables, or securely erases, any LOB apps the user installed from the SSP 112.

Figure 2:
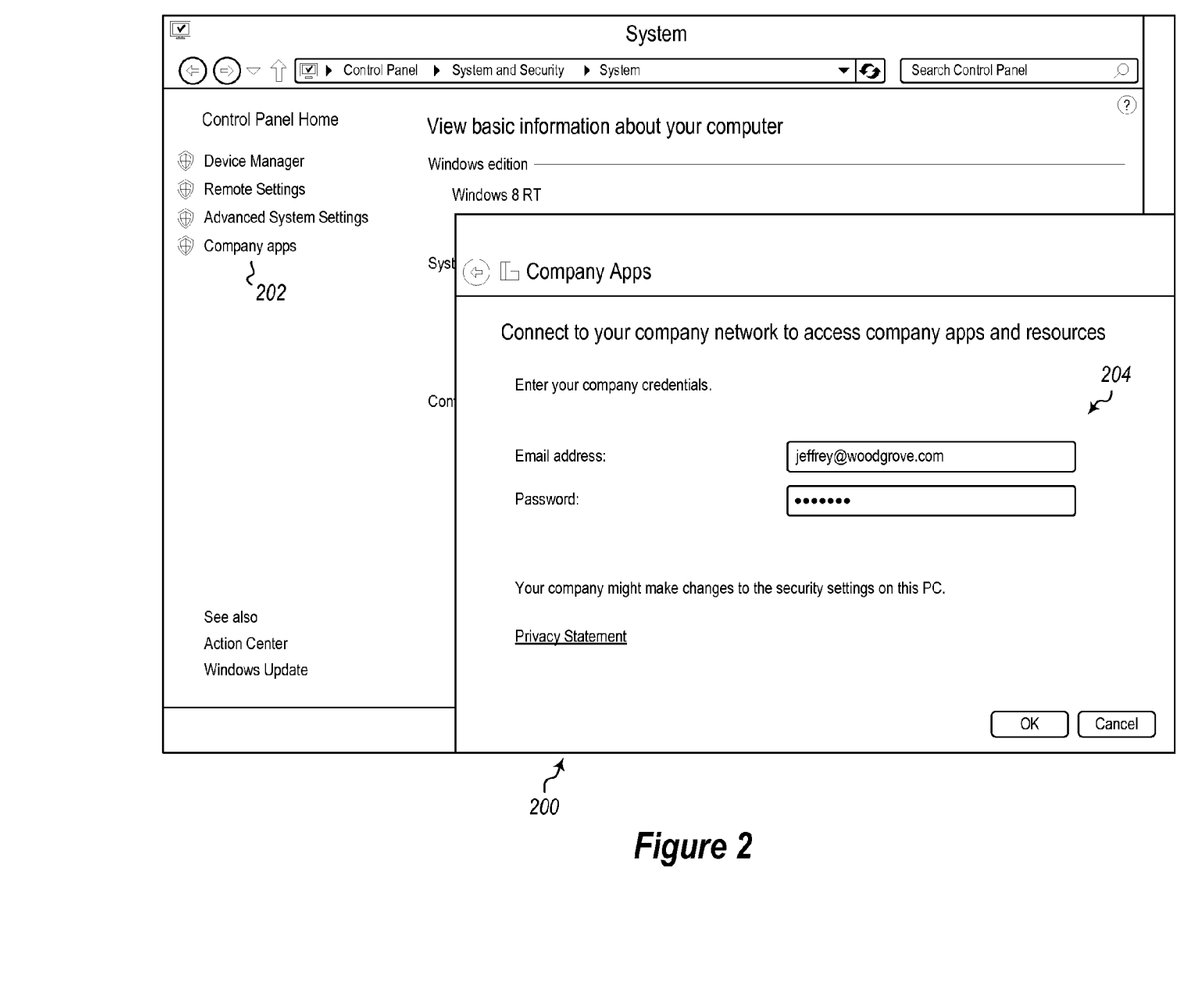
FIG. 2 illustrates a user interface for authenticating a user to an enterprise network.

The following now illustrates additional details regarding connecting the client device 102 to the management infrastructure 108. In some embodiments, connecting a client device 102 to the management infrastructure 108 begins with an IT administrator specifying the group of users, such as, for example, a group of Active Directory® (AD) (available from Microsoft® Corporation of Redmond Wash.) domain users who are authorized to connect devices 102 into the network enterprise 110. The administrator also has the option to specify the maximum number of devices allowed per user or other constraints related to per user enrollment policy. For example, other per user enrollment policy considerations may specify that a user can only enroll when on a particular network, with multi-factor authentication, within a given time period, etc. As illustrated in FIG. 2, an authorized user; selects a company apps link 202 of a user interface 200 and supplies their enterprise credentials 204. The agent 104 then performs a service lookup to locate the organization's management infrastructure 108.

Once the agent 104 has found the right address, it establishes a secure connection to the management infrastructure 108 and authenticates the user. If the user is successfully authenticated and has been authorized by the administrator to connect devices (e.g. device 102), the enterprise network 110 issues the right commands to configure the agent 104 for its ongoing communications with the management infrastructure 108. Once complete, the user is directed to install the SSP 112 while the agent 104 completes the connection in the background. Alternatively, the SSP 112 could be installed automatically by the management infrastructure at enrollment time. While in the example illustrated, a user has been authenticated to the management infrastructure 108, in alternative or additional embodiments, the device itself may be authenticated to the management infrastructure. For example, the device 102 could be redirected to a management service which would allow the device to be enrolled on the company's behalf.

Next, the agent 104 automatically initiates a session with the management infrastructure 108, using the settings that it already obtained. This session and any subsequent sessions may be performed over a secure connection. This initial session completes the registration of the device 102 with the enterprise network 110 by supplying some basic device information such as the manufacturer and model of the device 102, the operating system version of the device 102, device capabilities, and other hardware information for the device 102. This allows IT administrators to monitor what types of devices are connecting to the organization, so they can improve the apps and services they deliver to users over time.

Following the initial session, the agent 104 initiates communication with the management infrastructure 108 in two circumstances:

First, as a maintenance task that runs on a preset schedule, or from management infrastructure triggers or other triggers, that does not impact the user experience. The activities performed during these maintenance sessions focus on reporting updated hardware information to the management infrastructure 108, applying changes to the settings policies for the device 102, reporting compliance back to the management infrastructure 108, and applying app updates to LOB apps, or retrying any previously failed LOB app installations initiated from the SSP 112.

Secondly, the agent 104 will communicate with the management infrastructure 108 anytime the user initiates an app installation from the SSP 112. In some embodiments, these user-initiated sessions are solely focused on app installation and do not perform the maintenance and management activities described in the first case.

Regardless of whether a session is initiated automatically by a scheduled maintenance task or manually by the user, the client 102 device continues to behave well relative to the state of the battery on the device and its current network conditions.

Settings Policy Management

As already discussed, access to LOB apps typically requires systems to comply with basic security and data protection policies. From the management infrastructure 108, the IT administrator is able to configure a set of policies that they believe are important to give IT the assurances they need without seriously affecting the user's experience with their device. In particular, administrators can enforce password policies and turn off certain peripherals.

In addition to the configurable policies described above, the agent 104 can also be used to automatically configure other settings such as network settings, VPN configuration, WiFi settings, etc., so that the managed device 102 can easily connect to an enterprise network 110. Finally, the agent 104 can also monitor and report on compliance of the device 102 with a set of policies Leveraging this compliance information, IT administrators can more effectively control access to corporate resources on the enterprise network 110 if a device is determined to be at risk. Yet once again, the user's basic experience with the device is left intact and their personal privacy is maintained.

In some embodiments, the policies that can be enforced by the enterprise or other third parties may be configurable by the user of the device 102. For example, a user may be willing to accept some polices while refusing to accept other polices that the enterprise would like to enforce. Thus, a user can accept a level of control that the user is willing to give an enterprise over the device. This level of control indicated by the user of the device 102 may affect what settings the enterprise automatically configures on the device 102 and what apps the enterprise is willing to allow to be installed on the device 102.

For example, if a user is not willing to accept all policies that the enterprise would like to enforce, then the device 102 may only be allowed to install a limited set of apps on the device while being restricted from installing other apps on the device. Illustratively, the SSP 112 may provide a user interface that allows a user to select polices that the user is willing to accept. For example, the user interface may provide a list of policies with a set of check boxes where the user can select, by checking check boxes, which policies the user is willing to have enforced on the device 102. Alternatively, a wizard interface or other interface may be employed to obtain information about what policies the user is willing to have enforced on the device 102.

The policies that the user may select from may include, for example, restrictions on the device. For example, such restrictions may include items such as requiring a password on the device, requiring certain apps or software to be installed on the device, requiring certain settings on the device, limiting the device to use with certain types or certain networks, etc.

Alternatively or additionally, the policies the user may select from may include policy related to data access controls on the device 102. For example, the user may indicate that the enterprise is able to completely lock the device, erase all data on the device, restore the device to factory settings, erase all enterprise data on the device, erase data associated with certain apps on the device (such as enterprise apps, mail apps, etc.), etc.

LOB App Management

The previous discussion has been focused on the mechanics of the client device 102 and management infrastructure 108 along with the needs of the IT administrator. However, an important aspect of the above is the benefit that can be provided to the end user by enabling access to their LOB apps.

There are several different categories and types of apps that IT can publish for users in the SSP 112. For example, IT can publish: internally developed apps developed by the enterprise; apps produced by independent software vendors that are licensed to the organization for internal distribution; web links that launch websites and web-based apps directly in the browser; links to app listings in other application marketplaces (this is a convenient way for IT to make users aware of useful business apps that are publicly available); etc.

Figure 3:
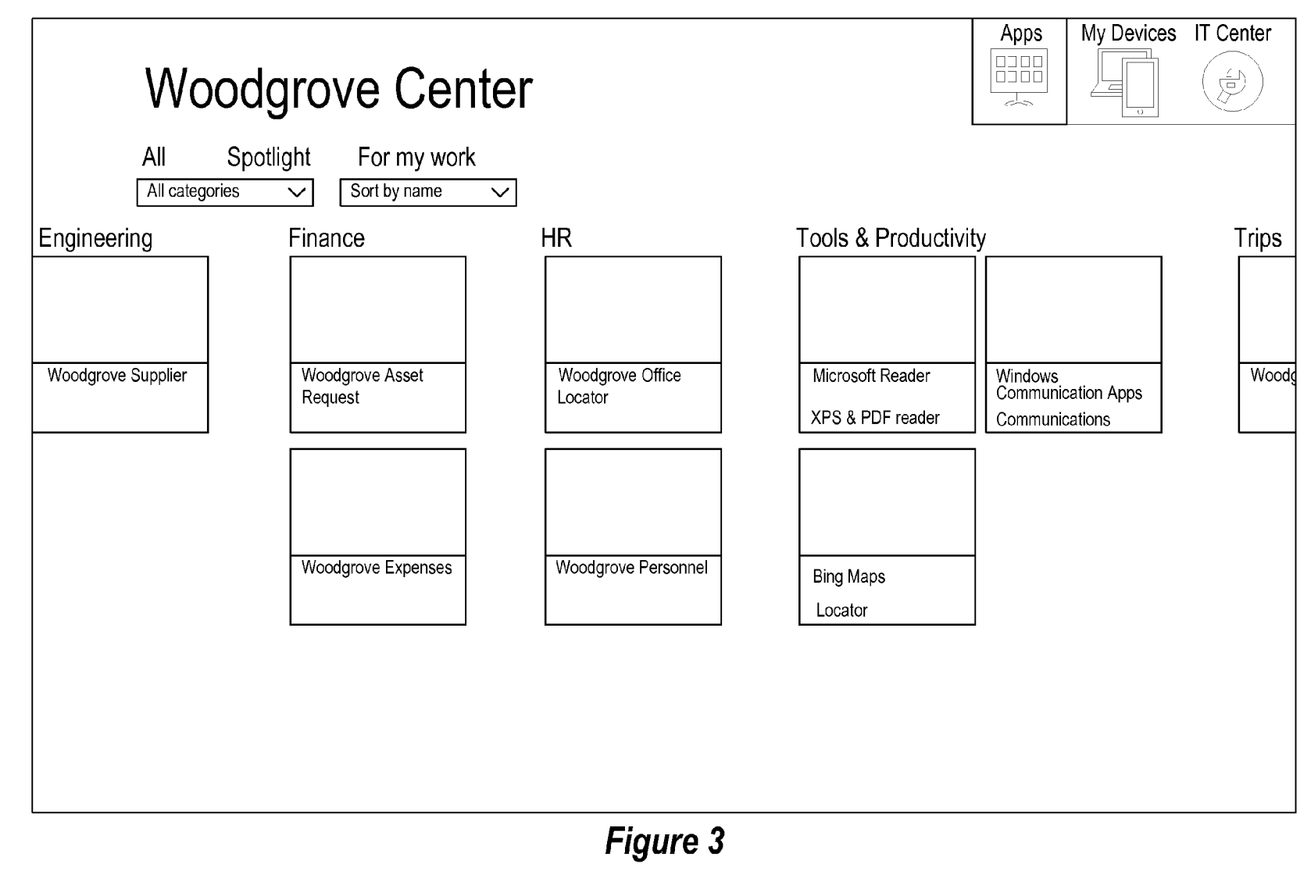
FIG. 3 illustrates a user interface for a user to select enterprise apps for installation on a device.

Because the user specified his or her corporate credentials as part of the initial connection with the management infrastructure 108, as illustrated in FIG. 2, the IT administrator can then specify which apps are published to each user individually. As a result, the user only sees those apps that are applicable to them in the SSP 112. FIG. 3 illustrates an example of the SSP 112 user experience for a user browsing for LOB apps in the SSP 112 for a fictional enterprise called "Woodgrove."

Notably, embodiments may be implemented in a closed app market environment. In such an environment, the typical user scenario is that users are only allowed to install apps from a pre-approved set of available apps from an authorized market. For example, using the Windows Phone™ available from Microsoft® Corporation of Redmond Wash., a user is typically only able to install apps from the Microsoft® official application marketplace which offers apps that have been evaluated and pre-approved for offering in the official application marketplace. In other embodiments, the closed app market environment may be closed as to certain types of apps, but open to other types of apps. For example, using Windows 8 available from Microsoft Corporation of Redmond Wash., a user is able to only install Windows Store Apps from the official application marketplace in the Windows 8 interface (such as that illustrated in FIG. 3), while other apps can be installed in the desktop interface with little or no restriction.

Embodiments may be extended to allow apps that are of a style or format to be typically offered in a closed app market environment, but that are not generally offered in the closed app market environment to nonetheless be "side-loaded" so as to allow enterprise specific apps, not offered in the closed market, to nonetheless be installed on the device 102. For example, a Windows® Phone would be able to install apps not offered in the official application marketplace. Alternatively, a Windows® 8 device would be able to install Windows Store Apps not available in the official application marketplace.

In some embodiments, this, or enabling certain settings or management functions, may be accomplished by installation of a side loading key 114 on the device 102 which, so long as the side loading key 114 is valid, allows the device 102 to side load apps 116 from a content server 118 of the management infrastructure, where the apps 116 are not offered generally in the closed app market 120, such as the apps 122.

However, while the apps 116 that can be installed using the side loading key 114 are not generally offered in the closed app market 120, in some embodiments, the apps 116 must still be validated and authorized to be installed on the device by a central authority. For example, the same central authority that validates and authorizes apps provided in the closed app market 120 may validate and authorize the apps intended to be side loaded onto the device 102, so long as the device 102 has a valid side loading key 114 (or other indication that the device is authorized to side load apps).

The side loading key 114 can be obtained in a number of different ways. For example, in some embodiments, the side loading key 114 may be purchased from the closed app market 120. In other embodiments, the key may be purchased by the enterprise from a central authority. In some embodiments, a single side loading key 114 may be valid for a particular number of installs onto devices. For example, the side loading key may be able to be installed on multiple different devices at any given time.

Figure 4:
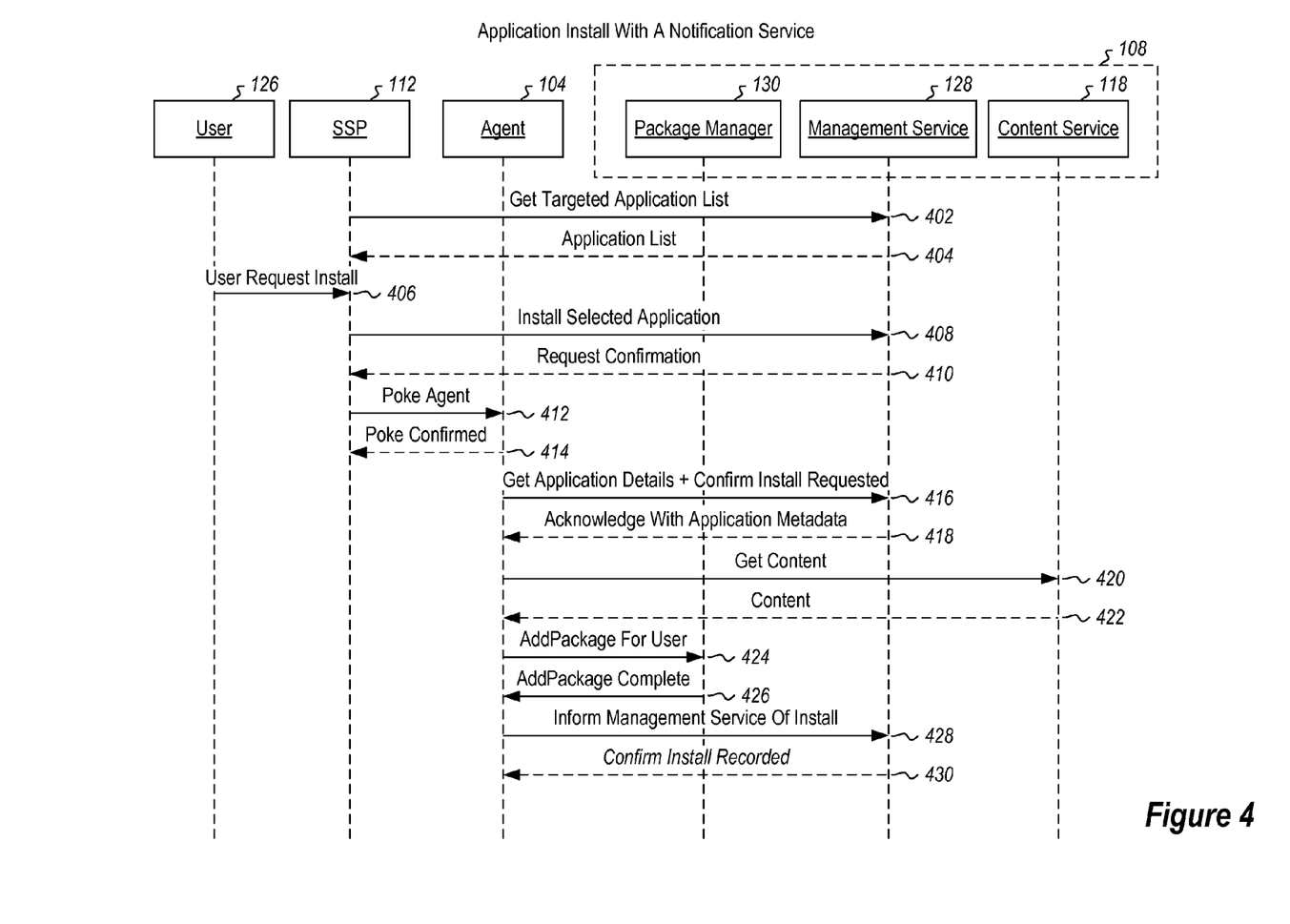
FIG. 4 illustrates a message flow for installing enterprise apps on a device.

In some embodiments, when the user chooses to install an app from the SSP 112, the request is sent to the management infrastructure 108 and a download link is provided to the agent 104. The agent 104 then downloads the app, verifies the validity of the content, checks the signature, and installs the app. All of this typically occurs within seconds and is generally invisible to the user. In the event that an error occurs during any part of this process (e.g. the location of the content is unavailable), the agent 104 queues the app for a retry during its next regularly scheduled maintenance session. In either case, the agent 104 reports the state of the installation back to the management infrastructure 108. FIG. 4 details this interaction.

In particular, FIG. 4 illustrates at 402 that the SSP 112 obtains a targeted app list from a management service 128 at the management infrastructure 108. The management service 128, as illustrated at 404, at the management infrastructure 108 sends back an app list to the SSP 112 where the app list includes an enumeration of apps available to be installed by the device 102. As illustrated at 406, the user 126 interacts with the SSP 112 and requests installation of an app. As illustrated at 408, the SSP 112 requests that the user requested app be installed by the management service 128. As illustrated at 410, the management service 128 confirms the request. As illustrated at 412, the SSP 112 pokes the agent 104 indicating to the agent that the app selected by the user 126 should be installed. As illustrated at 414, the agent 104 confirms the poke to the SSP 112. As illustrated at 416, the agent 104 requests app details and confirms the installation request by the user 126 to the management service 128. As illustrated at 418, the management service acknowledges the app requests to the agent 104. As illustrated at 420, the agent 104 requests app content from the content service 118 in the management infrastructure 108. As illustrated at 422, the content service 118 returns the app content to the agent 104 at the device 102. As illustrated at 424, the agent 104 communicates with a package manager 130 at the device 102 indicating that the app should be added for the user 126. As illustrated at 426, the package manager 130 indicates that installation of the app is complete. As illustrated at 428, the agent 104 informs the management service 128 that the app has been installed. As illustrated at 430, the management service 128 confirms to the agent 104 that the installation of the user selected app has been recorded.

In some alternative embodiments, the closed app market 120 itself may have certain app offerings available that are only available to devices with a side loading key installed on the device 102. For example, the closed app market 120 could provide one set of apps 122 generally to devices, but provide additional apps 124 for installation to devices based on side loading keys installed on the devices. The additional apps available for installation may be dependent on what side loading key is installed on the device. Thus, the closed app market 120 could maintain a set of apps, on behalf of the enterprise, for installation on enterprise authorized devices.

As part of its regular maintenance sessions, the agent 104 will inventory which LOB apps are currently installed and report that information back to the management infrastructure 108 so the IT administrator can effectively manage their LOB apps. In some embodiments, only apps that were installed via the SSP 112 and the client device 102 are included in this inventory from a device. In some embodiments, generally available apps installed from a closed app market are not reported as part of the inventory. In some embodiments, the agent 104 may be restricted to only be able to inventory enterprise apps 116 and is not able to inventory apps 122 on the device 102 that the user has installed for personal use.

Anytime the IT administrator publishes an update for an app that has been installed on an enterprise authorized device 102, the agent 104 will automatically download and install the update during its next regular maintenance session. Alternatively, during a regular maintenance window the management infrastructure 108 may detect that an update is available and applicable, and as a result, notify the user Disconnecting from the Management Infrastructure 108

Details are now illustrated on how to disconnect a device from the management infrastructure 108. Disconnecting may be initiated either locally by the user or remotely by the user or the IT administrator. Users may choose to disconnect for any number of reasons, including leaving the enterprise or getting a new device and no longer needing access to their LOB apps on the old device. Administrators may choose to disconnect a user's device after they have left the enterprise or because the device is regularly failing to comply with the organization's security settings policy. In another alternative embodiment, the enterprise may automatically disconnect a user device 102 if the device has not connected to the enterprise network 110 for a given period of time.

During disconnection, the agent 104 performs a number of actions (and/or ceases performing a number of actions). For example, the agent 104. removes access to all the apps that the user obtained from the enterprise. In some embodiments, the agent 104 can block access to the apps 116 or can completely remove the apps 116 from the device 102. The agent 104 ceases enforcement of the settings policies that the management infrastructure 108 has applied. The agent 104 reports successful deactivation to the management infrastructure 108 if the administrator initiated the process. The agent 104 removes the agent 104 configuration, including the scheduled maintenance task. Once completed, the agent 104 remains dormant unless the user reconnects it to the management infrastructure 108 or another management infrastructure.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
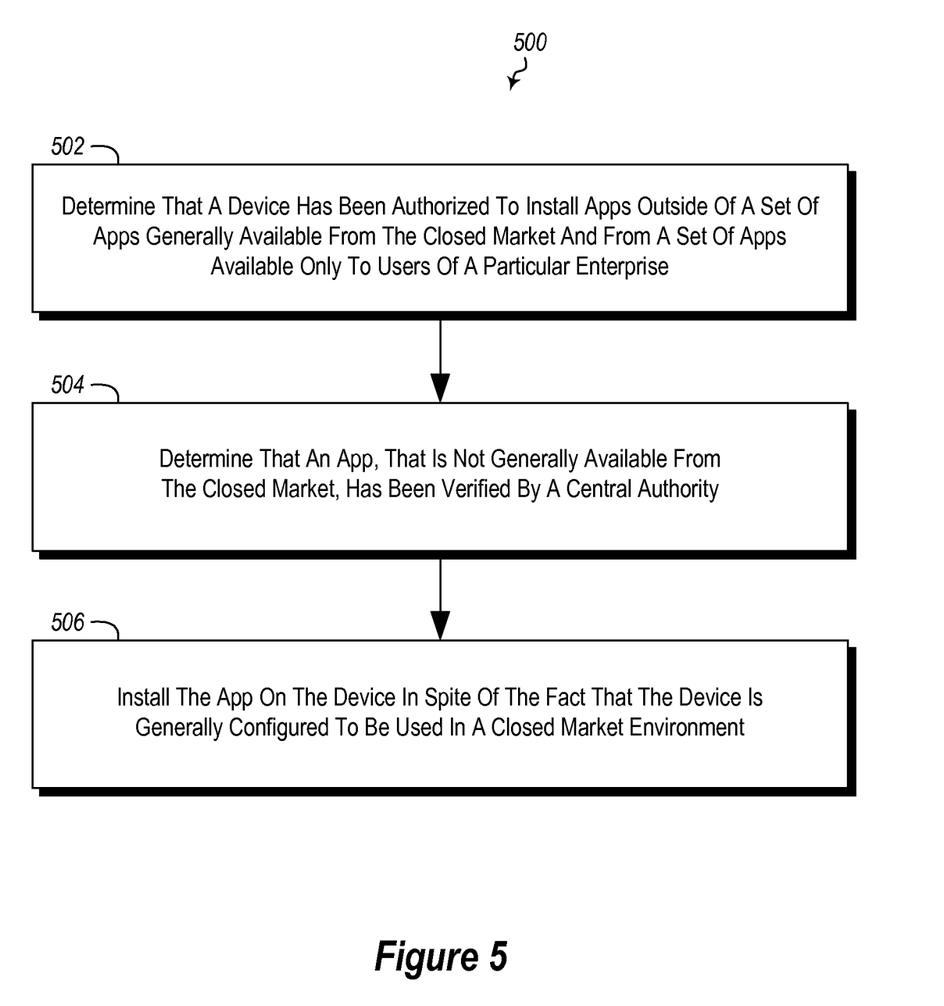
FIG. 5 illustrates a method of installing apps on a device.

Referring now to FIG. 5, a method 500 is illustrated. The method 500 includes acts for installing apps on a device. The device is generally configured to be used in a closed market environment that only allows generally available apps of the closed market to be installed. The method 500 includes determining that the device has been authorized to install apps outside of a set of apps generally available from the closed market and from a set of apps available only to users of a particular enterprise (act 502). For example, the method 500 may be performed where determining that the device has been authorized to install apps outside of a set of apps generally available from the closed market comprises determining that a side loading key has been installed on the device. Such an example is illustrated in FIG. 1 by using the side loading key 114 with the device 102.

The method 500 further includes determining that an app, that is not generally available from the closed market, has been verified by a central authority (act 504). The method 500 may be practiced where determining that an app that is not generally available from the closed market has been verified by a central authority includes determining that the app has been verified by a central authority responsible for the closed market. For example, if Microsoft® runs a closed market, but the app is not provided by the closed market run by Microsoft® Corporation, Microsoft® Corporation could nonetheless verify the app. For example, as illustrated and FIG. 1, the entity responsible for maintaining the market 120 and verifying the apps 122 may also verify the apps 116 in spite of the fact that the apps 116 are not offered in the market 120. Thus the apps 116 available from the enterprise network 110 nonetheless have an authority chain to a central authority.

The method 500 further includes installing the app on the device in spite of the fact that the device is generally configured to be used in a closed market environment (at 506).

The method 500 may further include providing a user interface to a user to allow a user to select the app from among a set of apps available for devices authorized to connect to the particular enterprise; receiving user input selecting the app; notifying a service that the user has selected the app; receiving a notification from the service that the app is available to be installed; and wherein installing the app on the device is performed in a fashion that minimizes disruption to the device. Examples of this functionality are illustrated in FIGS. 3 and 4. In particular, FIG. 3 illustrates a user interface that may be presented to a user to allow a user to select apps for installation. FIG. 4 illustrates an example of communication between various entities to allow a user to indicate what apps the user would like to install in the process for installing the apps. In some such embodiments, the app may be installed when the device determines that it has sufficient free resources to install the app without serious impact to the user experience of the device.

The method 500 may further include maintaining an enumeration of apps from the set of apps available only to users of a particular enterprise that have been installed on the device. In particular, a manifest may be maintained at the device 102 and the agent 104 that enumerates the various apps that have been installed on the device 102. This can be used to report to an enterprise central authority information about what apps are installed on the device 102.

The method 500 may further include providing a report to an enterprise administrator. The report may include an enumeration of all apps from the set of apps available only to users of a particular enterprise that have been installed on the device without identifying in the report other apps that have been installed on the device. For example, the report may identify any the apps 116 that have been installed on the device 102 but will not identify any apps selected from the set of apps 122 that have been installed on the device 102.

The method 500 further includes various acts for removing the device 102 from the enterprise network 110. For example, the method 500 may include deauthorizing the device such that the device can no longer install apps from among the set of apps available only to users of a particular enterprise; disabling or deleting any apps from among the set of apps available only to users of a particular enterprise that have already been installed on the device; and making data associated with any apps from among the set of apps available only to users of a particular enterprise that have already been installed on the device inaccessible. In some embodiments, this may be performed in response to the device not contacting a management infrastructure for a pre-determined period of time. In alternative or additional embodiments, this may be performed in response to a user indicating a desire to disconnect the device from the enterprise. In yet another additional or alternative embodiment this may be performed in response to an administrator indicating a desire to disconnect the device from the enterprise.

Figure 6:
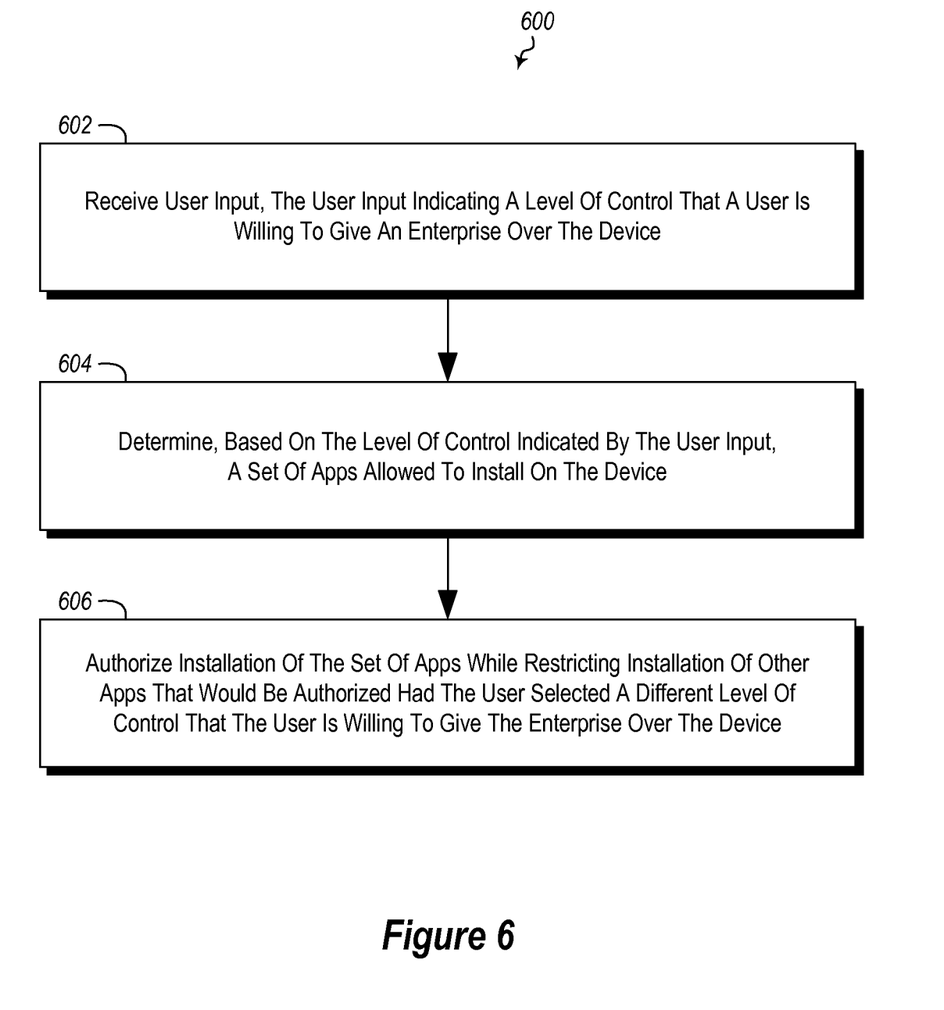
FIG. 6 illustrates a method of installing apps and setting configuration on a device.

Referring now to FIG. 6, a method 600 is illustrated. The method 600 includes acts for installing apps and setting configuration on a device. The method 600 includes receiving user input from a user of a device, the user input indicating a level of control that the user is willing to give an enterprise over the device (act 602). The method 600 may be practiced where the user input comprises a user indicating that the enterprise may enforce one or more restrictions on the device. For example, the one or more restrictions may include one or more of requiring a password, requiring certain apps to be installed on the device, limiting access of the device to certain networks or the like. Alternatively or additionally, the method 600 may be practiced where the user input comprises a user indicating that the enterprise may control data access on the device. For example, the user input may indicate that the enterprise may perform one or more of locking the device, erasing all user data on the device, restoring the device to factory settings, erasing all enterprise data on the device, erasing data associated with certain apps on the device, or the like. The method 600 may be practiced where the user input comprises a user selecting a plurality of items from a predetermined list, such as a checkbox list, that the user is willing to let the enterprise control or restrict on the device.

The method 600 further includes determining, based on the level of control indicated by a user, a set of apps that the user is allowed to install on the device (act 604). The set of apps that the user is allowed to install on the device is limited by the level of control indicated by the user.

The method 600 further includes authorizing the device to install the set of apps while restricting the device from installing other apps that would be authorized had the user selected a different level of control that the user is willing to give the enterprise over the device (act 606). For example, a device, such as device 102, may be allowed to install some apps, but not other apps based on the user setting and the level of control that the user is willing to allow the enterprise to have over the device 102. In some embodiments, the method 600 may be practiced where the device is generally configured to be used in a closed market environment that only allows generally available apps of the closed market to be installed on the device, but the device is authorized to install apps outside of a set of apps generally available from the closed market and wherein the set of apps are available only to users of the particular enterprise.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system having a hardware processor and memory with stored computer-executable instructions for providing applications to a device, the method comprising:

the computing system providing to the device a listing of a plurality of restrictions associated with a level of control over the device that a user of the device is requested to grant to an enterprise administrator, including presenting a first data access control that the enterprise administrator requests permission to perform on the device and a second data access control that the enterprise administrator requests permission to perform on the device;

the computing system receiving from the device user selections from among the plurality of restrictions, including a first user selection at the device that grants the enterprise administrator permission to perform the first data access control on the device and a second user selection at the device that denies the enterprise administrator permission to perform the second data access control on the device;

the computing system determining, based on the user selections, a first set of one or more applications that are allowed to be installed on the device, wherein the first set of one or more applications that are allowed to be installed on the device is a filtered set of applications that includes one or more first applications that are permitted to be installed on the device based on the user having granted the administrator permission to perform the first data access control on the device, and that excludes a second set of one or more applications that would be allowed to be installed on the device had the user granted the enterprise administrator permission to perform the second data access control on the device; and the computing system providing to the device a listing of the first set of one or more applications subsequent to providing to the device the listing of the plurality of restrictions and subsequent to receiving the user selections.

2. The method of claim 1, wherein the plurality of restrictions include at least one of requiring a password, requiring certain applications to be installed on the device, limiting access of the device to certain networks, requiring the device to have encryption turned on, requiring that there is an antivirus application installed, requiring that the antivirus application is up to date, requiring that the device meets a minimum OS version, requiring that a password on the device has a certain complexity level, requiring that a password on the device has certain history requirements, requiring that hardware of the device is configured a certain way, requiring that a camera on the device is disabled, or requiring that Bluetooth on the device is disabled.

3. The method of claim 1, wherein the first data access control comprises at least one of erasing all user data on the device, restoring the device to factory settings, erasing all enterprise data on the device, or erasing data associated with certain applications on the device.

4. The method of claim 1, wherein the device is generally configured to be used in a closed market environment that only allows generally available applications of the closed market to be installed on the device, and wherein the method further comprises authorizing the device to install applications outside of the generally available applications of the closed market, including sending an enterprise sideloading key to the device.

5. The method of claim 4, further comprising receiving a listing of applications that are installed at the device, the listing excluding any applications that are installed at the device and that were obtained by the device from the closed market.

6. The method of claim 1, wherein the first and second set of one or more applications are selected from applications provided by an enterprise, and are not generally available from a closed market that only allows generally available applications of the closed market to be installed on the device, but have been verified by a central authority responsible for the closed market.

7. The method of claim 1, wherein the first set of one or more applications are installable at the device only when the device possesses a first sideloading key, and wherein the second set of one or more applications are installable at the device only when the device possesses a second sideloading key, the method further comprising providing only the first sideloading key to the device based on the user selections.

8. A system for installing applications and setting configuration on a device, the system comprising:
one or more hardware processors; and
one or more computer readable media, wherein the one or more computer readable media comprise computer executable instructions that are executable by the one or more of the processors and that configure the system to perform at least the following:
provide to the device a listing of a plurality of restrictions associated with a level of control over the device that a user of the device is requested to grant to an enterprise administrator, including presenting a first data access control that the enterprise administrator requests permission to perform on the device and a second data access control that the enterprise administrator requests permission to perform on the device;
receive from the device user selections from among the plurality of restrictions, including a first user selection at the device that grants the enterprise administrator permission to perform the first data access control on the device and a second user selection at the device that denies the enterprise administrator permission to perform the second data access control on the device;
determine, based on the user selections, a first set of one or more applications that are allowed to be installed on the device, wherein the first set of one or more applications that are allowed to be installed on the device is a filtered set of applications that includes one or more first applications that are permitted to be installed on the device based on the user having granted the administrator permission to perform the first data access control on the device, and that excludes a second set of one or more applications that would be allowed to be installed on the device had the user granted the enterprise administrator permission to perform the second data access control on the device; and
provide to the device a listing of the first set of one or more applications subsequent to providing to the device the listing of the plurality of restrictions and subsequent to receiving the user selections.

9. The system of claim 8, wherein the plurality of restrictions include at least one of requiring a password, requiring certain applications to be installed on the device, limiting access of the device to certain networks, requiring the device to have encryption turned on, requiring that there is an antivirus application installed, requiring that the antivirus application is up to date, requiring that the device meets a minimum OS version, requiring that a password on the device has a certain complexity level, requiring that a password on the device has certain history requirements, requiring that hardware of the device is configured a certain way, requiring that a camera on the device is disabled, or requiring that Bluetooth on the device is disabled.

10. The system of claim 8, wherein the first data access control comprises at least one of erasing all user data on the device, restoring the device to factory settings, erasing all enterprise data on the device, or erasing data associated with certain applications on the device.

11. The system of claim 8, wherein the device is generally configured to be used in a closed market environment that only allows generally available applications of the closed market to be installed on the device, and wherein the computer executable instructions also configure the system to authorize the device to install applications outside of the generally available applications of the closed market, including sending an enterprise sideloading key to the device.

12. The system of claim 11, wherein the computer executable instructions also configure the system to receive a listing of applications that are installed at the device, the listing excluding any applications that are installed at the device and that were obtained by the device from the closed market.

13. The system of claim 8, wherein the first and second set of one or more applications are selected from applications provided by an enterprise, and are not generally available from a closed market that only allows generally available applications of the closed market to be installed on the device, but have been verified by a central authority responsible for the closed market.

14. The system of claim 8, wherein the first set of one or more applications are installable at the device only when the device possesses a first sideloading key, and wherein the second set of one or more applications are installable at the device only when the device possesses a second sideloading key, and wherein the computer executable instructions also configure the system to provide only the first sideloading key to the device based on the user selections.

15. A computer program product comprising one or more computer-readable hardware storage devices comprising computer executable instructions that are executable by one or more processors of a computing system and that configure the computing system to perform at least the following:
provide to the device a listing of a plurality of restrictions associated with a level of control over the device that a user of the device is requested to grant to an enterprise administrator, including presenting a first data access control that the enterprise administrator requests permission to perform on the device and a second data access control that the enterprise administrator requests permission to perform on the device;

receive from the device user selections from among the plurality of restrictions, including a first user selection at the device that grants the enterprise administrator permission to perform the first data access control on the device and a second user selection at the device that denies the enterprise administrator permission to perform the second data access control on the device;

determine, based on the user selections, a first set of one or more applications that are allowed to be installed on the device, wherein the first set of one or more applications that are allowed to be installed on the device is a filtered set of applications that includes one or more first applications that are permitted to be installed on the device based on the user having granted the administrator permission to perform the first data access control on the device, and that excludes a second set of one or more applications that would be allowed to be installed on the device had the user granted the enterprise administrator permission to perform the second data access control on the device; and provide to the device a listing of the first set of one or more applications subsequent to providing to the device the listing of the plurality of restrictions and subsequent to receiving the user selections.

16. The computer program product of claim 15, wherein the plurality of restrictions include at least one of requiring a password, requiring certain applications to be installed on the device, or limiting access of the device to certain networks.

17. The computer program product of claim 15, wherein the first data access control comprises at least one of erasing all user data on the device, restoring the device to factory settings, erasing all enterprise data on the device, or erasing data associated with certain applications on the device.

18. The computer program product of claim 15, wherein the first and second set of one or more applications are selected from applications provided by an enterprise, and are not generally available from a closed market that only allows generally available applications of the closed market to be installed on the device, but have been verified by a central authority responsible for the closed market.

19. The computer program product of claim 15, wherein the device is generally configured to be used in a closed market environment that only allows generally available applications of the closed market to be installed on the device, and wherein the computer executable instructions also configure the computing system to authorize the device to install applications outside of the generally available applications of the closed market, including sending an enterprise sideloading key to the device.

20. The computer program product of claim 15, wherein the first set of one or more applications are installable at the device only when the device possesses a first sideloading key, and wherein the second set of one or more applications are installable at the device only when the device possesses a second sideloading key, and wherein the computer executable instructions also configure the computing system to provide only the first sideloading key to the device based on the user selections.

21. The computer program product of claim 15, wherein the computer executable instructions also configure the computing system to receive a listing of applications that are installed at the device, the listing excluding any applications that are installed at the device and that were obtained by the device from the closed market.

\* \* \* \* \*